United States Patent [19]

Schilling, Jr.

[11] 4,051,627
[45] Oct. 4, 1977

[54] DEVICE FOR ROTATING AND WATERING POTTED PLANTS

[76] Inventor: Robert G. Schilling, Jr., 36-21 193rd St., Flushing, N.Y. 11358

[21] Appl. No.: 655,685

[22] Filed: Feb. 6, 1976

[51] Int. Cl.² .................. A47G 7/02; A01G 27/00
[52] U.S. Cl. .................................. 47/39; 47/79; 222/214; 239/327; 417/478
[58] Field of Search .................. 47/38, 39, 48.5, 1, 47/39; 222/214, 192, 70; 239/274, 279–281, 289, 327; 111/7.1, 7.2; 417/478

[56] References Cited

U.S. PATENT DOCUMENTS

| 1,525,571 | 2/1925 | Cypert | 239/289 X |
|---|---|---|---|
| 1,885,117 | 11/1932 | Lemert | 47/39 |
| 2,018,003 | 10/1935 | Axtell | 111/7.1 |
| 2,808,013 | 10/1957 | Dean | 111/7.1 |
| 3,168,797 | 2/1965 | Patassy | 47/38 |
| 3,360,885 | 1/1968 | St. Clair | 47/40 |
| 3,644,086 | 2/1972 | O'Dell | 239/274 X |
| 3,865,275 | 2/1975 | De Nunzio | 222/70 |
| 3,926,347 | 12/1975 | Low et al. | 222/214 X |

FOREIGN PATENT DOCUMENTS

| 1,177,401 | 9/1964 | Germany | 47/38 |
|---|---|---|---|
| 46,522 | 2/1962 | Poland | 47/38 |

Primary Examiner—Edgar S. Burr
Assistant Examiner—Steven A. Bratlie
Attorney, Agent, or Firm—Steinberg & Blake

[57] ABSTRACT

A device for automatically caring for potted plants includes a rotary support carrying a potted plant and supported by a suitable base on which there is a container for liquid to be fed to the potted plant. The rotary support is driven so as to be rotated at a speed according to which the time required for one revolution of the rotary support does not form a multiple or fraction of 24. The container for the liquid is flexible while the rotary support carries at least one cam to compress the container in order to discharge liquid out of the latter, and a feed tube extends from the container to the potted plant to deliver liquid thereto each time the cam compresses the container. A stationary tilling element is carried by the base at a position for tilling soil in a pot of a potted plant, and the rotary movement of the potted plant with the rotary support displaces soil in the potted plant with respect to the stationary tilling element so that the soil becomes tilled while the support for the potted plant turns.

9 Claims, 4 Drawing Figures

DEVICE FOR ROTATING AND WATERING POTTED PLANTS

BACKGROUND OF THE INVENTION

The present invention relates to potted plants and in particular to devices for caring automatically for potted plants.

As is well known, it is highly desirable to provide devices capable of automatically caring for potted plants so that in this way manual operations in connection with the care of the potted plants need not be carried out. Thus it becomes possible for potted plants to remain unattended for extended periods of time, while people are away on vacation, for example, so that during such times the potted plants will be automatically cared for. Conventional devices of this type, however, are concerned only with automatically continuing the feeding of a suitable liquid to a potted plant. It is known, for example, to provide communication between a potted plant and a source of liquid through wicks which by capillary action automatically feed liquid to the potted plant. Also, there are known relatively complex moisture-detecting devices which respond when detecting a certain lower limit of moisture to bring about automatic feeding of liquid to a potted plant.

However, such known devices do not solve the problem. The feeding of liquid is, for example, highly localized so that suitable distribution of liquid through the potted plant is not assured. Also, even if liquid is supplied, the soil of the potted plant can become undesirably dry and crusted particularly at the exposed surface of the soil, so as to prevent proper aeration of the potted plant. In addition, potted plants which are cared for by known automatic devices conventionally remain stationary so that the plants tend to grow with an undesirable bias toward the sunlight.

SUMMARY OF THE INVENTION

It is accordingly a primary object of the present invention to provide a device which will solve the above problems.

In particular, it is an object of the present invention to provide a device which will automatically care for one or more potted plants in such a way that not only is feeding of a suitable liquid assured in a fully automatic manner but in addition aeration of the soil is also automatically provided and futhermore an undesirable bias in the growth of the plant is avoided.

Furthermore, it is an object of the present invention to provide a device which will feed liquid to a potted plant automatically at timed intervals so that reliance need not be made on the moisture content of the potted plant.

Furthermore, it is an object of the present invention to provide a device of the above type which is relatively simple and inexpensive while at the same time being highly reliable in its operation.

According to the invention, a support means supports the potted plant for rotary movement at a turning speed which will avoid an undesirable bias in the growth of the plant while a tilling element is situated with respect to the potted plant to respond to the rotary movement thereof for tilling the soil of the potted plant. The rotary support means carries a means which cooperates with a container for liquid for the plant to discharge liquid out of the container at given intervals with the liquid being delivered from the container through a suitable feedtube means to the plant at timed intervals.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
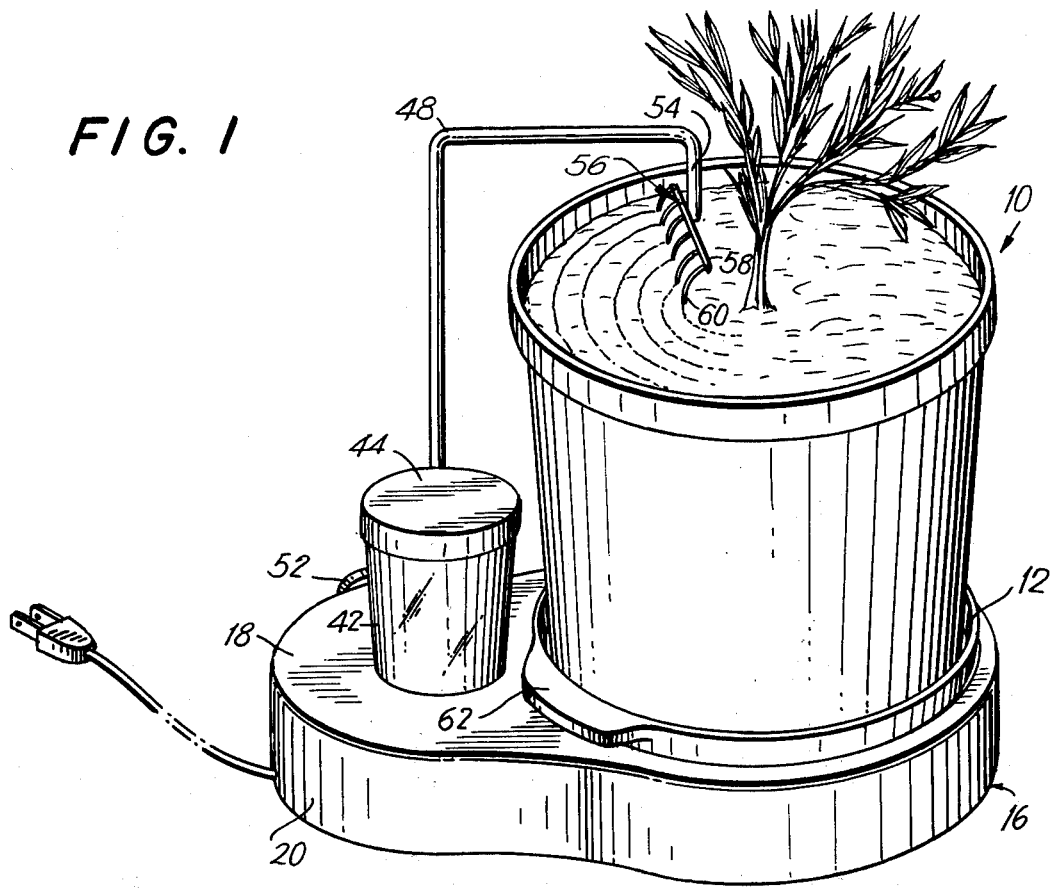
FIG. 1 is a perspective illustration of one possible device according to the invention.
Figure 4:
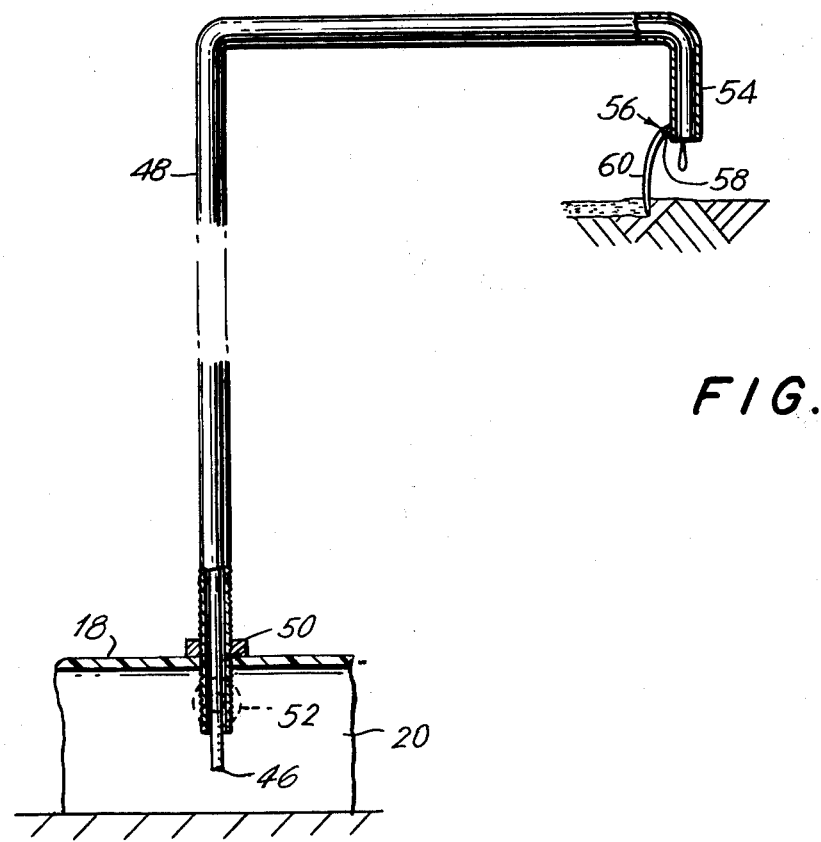
FIG. 4 is a fragmentary sectional view taken along line 4-4 of FIG. 2 in the direction of the arrows.
Figure 2:
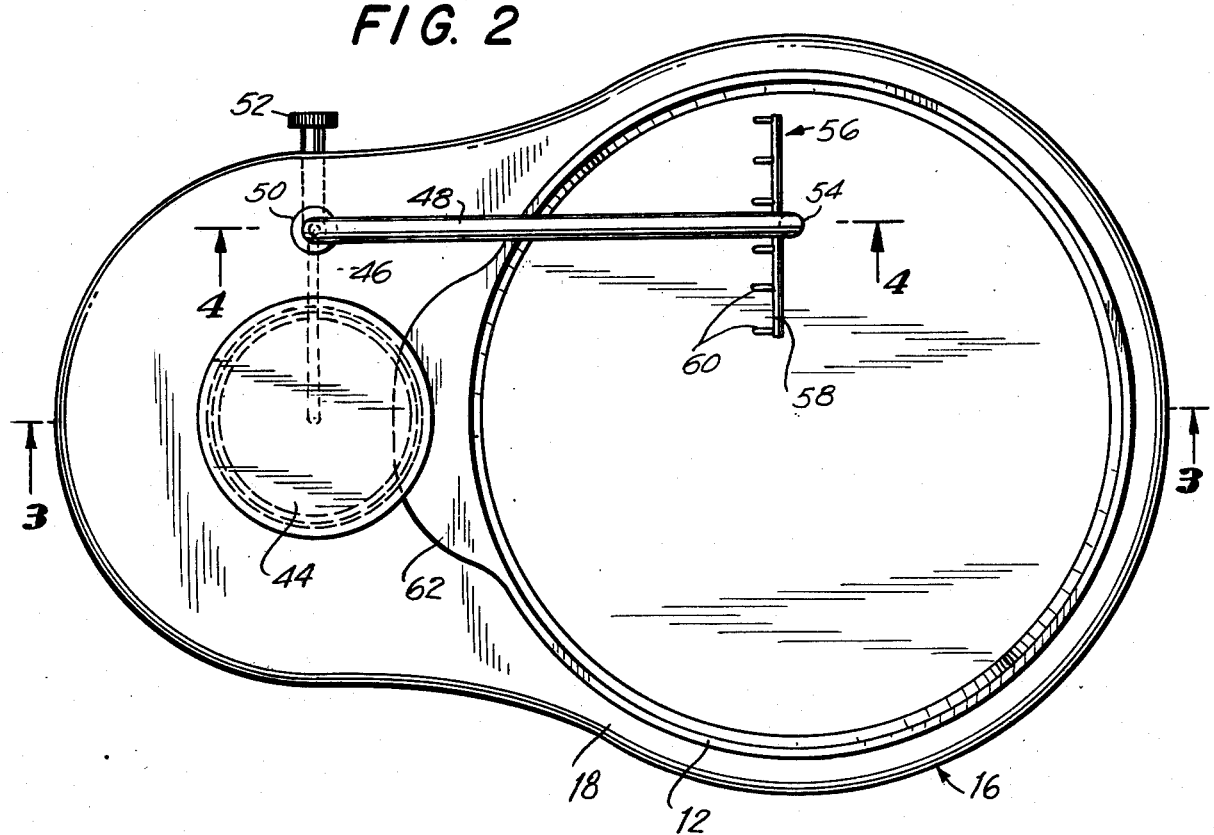
FIG. 2 is a top plan view of the device of FIG. 1 without the potted plant which is shown in FIG. 1.

Referring now to the drawings, there is illustrated in FIG. 1 a potted plant 10 which is capable of being automatically cared for by the device of the invention. This potted plant 10 is supported on a support means 12 in the form of a circular dished member made of a suitable plastic, for example, and having a diameter large enough to accommodate relatively large as well as relatively small pots. As is shown most clearly in FIG. 3, the support means 12 is supported for rotary movement by a bearing means 14 which in turn is carried by a suitable base means 16. The base means 16 has an upper wall 18 from which a side wall 20 extends downwardly, and the lower edge of the side wall 20 is adapted to rest on any suitable support 22 with the hollow interior of the base means accommodating various components as shown in FIGS. 3 and 4.

Thus, within the hollow interior of the base means 16 there is a moving means 24 which is connected by a suitable transmission to the rotary support means 12 so as to turn the latter. Thus, the moving means 24 may take the form of a suitable electric motor 26 fixed in any suitable way to the lower surface of the top wall 18 of the base means 16 and connected through a suitable cord 28 to a wall outlet, the cord 28 extending through a suitable notch adjacent the lower peripheral edge of the side wall 20 of the base means 16. The motor 26 drives a suitable step-down transmission 30 which in turn serves to rotate a pinion 32. The pinion 32 meshes with a ring gear 34 which is formed at the exterior surface of a rigid tube 36 which is fixed to and extends downwardly from the lower surface of the rotary support means 12. Thus, the moving means 24 will turn the support means 12 when the motor 26 is connected to a source of current.

The time required for one revolution of the rotary support means 12 is such that this time when multiplied or divided by a whole number will not equal 24. For example, the moving means 24 may be designed to rotate the support means 12 through one revolution each seven hours. As a result there will be no particular bias on the growth of a plant, since the speed of rotation thereof is asynchronous with the speed of rotation of the earth relative to the sun.

Figure 3:
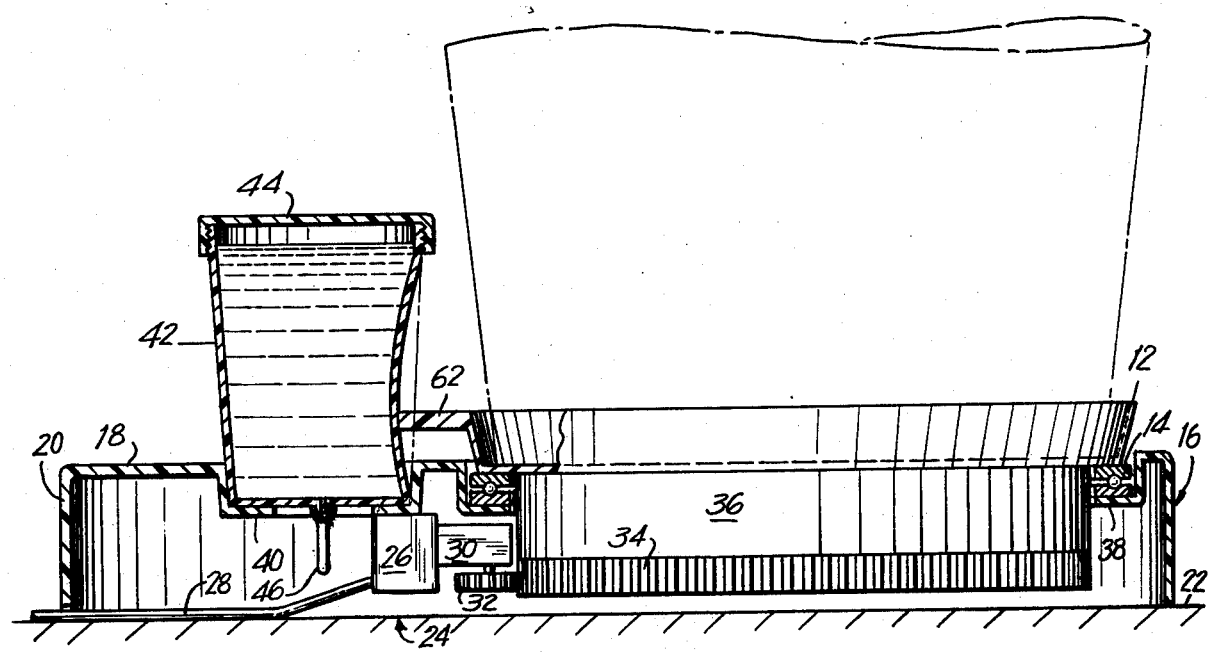
FIG. 3 is a sectional elevation of the structure of FIG. 2 taken along line 3-3 of FIG. 2 in the direction of the arrows.

The wall 18 is formed with a depressed annular portion 38 which carries the bearing means 14 as shown in FIG. 3, and the tubular structure which is formed with the ring gear 34 extends through the annular depressed portion 38.

The top wall 18 is formed with a second annular depressed portion 40 which carries a container means 42 which is adapted to contain liquid which is to be fed to the potted plant 10. This liquid may simply be water or water containing a suitable nutrient for the plant. The size of the container means 42 is such that it can contain, for example, enough liquid to feed a plant over a period of 2 weeks.

The container means 42 is capable of being fluid-tightly closed by a cover 44 after the container means 42 is filled. This container means 42 is preferably made of a transparent material so that the operator can at any time see how much liquid remains in the container 42. Also, the container 42 is made of a plastic material such as polyethylene, for example, which is flexible and resilient for a purpose referred to below.

As is apparent from FIG. 3, a feed-tube means 46 extends through the opening surrounded by the annular portion 40 of the wall 18 which seats the container means 42. Thus the bottom wall of the container means 42 may have a small tubular outlet fluid-tightly connected with an elongated flexible tube 46 which is of such a small diameter that this tube 46 acts as a capillary tube. The part of the tube 46 which is not shown in FIG. 3 is illustrated in FIG. 4. Thus it will be seen that the capillary tube 46 extends along the interior of a hollow substantially rigid tubular arm 48 which, as described below, forms part of a tilling means for tilling the soil of the potted plants 10. The hollow tubular arm 48 fixedly carries next to the upper surface of the wall 18 a collar 50, and the arm 48 can thus be turned with respect to the wall 18 of the base means 16. A suitable fixing means 52 is provided for fixing the arm 48 in an adjusted angular position. Thus, the fixing means 52 is in the form of a screw which can be turned by the operator and which extends through the threaded interior of a suitable fitting carried by the side wall 20 of the base means 16. Thus the inner end of the fixing screw 52 can be pressed against the tubular arm 48 after the angular position of the latter has been adjusted.

The tubular arm 48 extends upwardly from the wall 18 and has over the latter a horizontal portion which then terminates over the support means 12 in a downwardly directed free end portion 54. The free end portion 54 of the arm 48 terminates in an open end, and the same is true of the opposite end of the arm 48. The capillary tube 46 extends through the hollow interior of the tubular arm 48 as is apparent from FIG. 4.

The adjustable tilling means includes in addition to the arm 48 a tined element 56 having a transverse rod 58 fixed to the exterior of the free end portion 54 of arm 48 in any suitable way as by being welded thereto, for example, and from the rod 58 there extends a plurality of tines 60.

The collar 50 preferably takes the form of a nut which is threaded on the exterior of the arm 48 so that the elevation of the latter can be adjusted, and of course the angular position thereof can be adjusted, so that in this way the tines 60 can be properly positioned with respect to soil or the like in the pot of the potted plant 10. The free ends of the tines 60 may be adjusted so as to penetrate through a depth of one-half inch, for example, into the soil or the like in the pot of the potted plant 10.

According to a further feature of the invention, the peripheral side wall of the dished support means 12 fixedly carries a cam 62 which thus turns along a predetermined path during rotary movement of the support means 12. The container means 42 is situated along this path so that it will be compressed by the cam 62 once during each revolution of the support means 12. The compression of the flexible wall portion of the container means 42 will result in discharge of liquid out of the latter through the cappillary tube 46, and this liquid will of course fall from the tube 46 onto the soil which has been tilled by the tilling means in response to rotary movement of the potted plant 10 with respect to the tines 60. When the cam 62 turns beyond the container means 42, air can flow back through the capillary tube 46 upwardly through the liquid in the container means 42 to become situated thereover between the liquid and the cover 44 which tightly closes the container. Thus, during the next revolution of the support means 12 the cam will again act as a discharge means to discharge liquid out of the container means 42 and through the feed-tube means 46 to the potted plant 10.

If desired, more than one cam 62 may be fixed to the outer periphery of the rotary support means 12 so that liquid can be discharged out of the container means 42 and through the feed-tube means 46 a plurality of times during each revolution of the support means 12.

Thus, the angular and elevational adjustments possible for the tilling means formed by the arm 48 and the tined element 56 can adapt the positioning of the tines 60 with respect to pots of different sizes. Moreover, the fact that the timing of each revolution of the support means 12 does not form a complete multiple of 24 hours or a predetermined fraction thereof will prevent undesirable bias in the growth of the plant. Furthermore, the timed discharge of liquid will assure proper maintenance of the moisture in the soil or the like.

The arm 48 serves not only as part of the tilling means but also to protect and support the feed-tube means 46. Also with this arrangement the liquid will necessarily be deposited on tilled soil so as to penetrate easily into the soil of the potted plant. The timing of the discharge of the liquid is such that there will not be an excessive liquid passing through the soil into the dished support means 12 to evaporate therefrom.

Thus, the device of the invention is exceedingly simple while at the same time assuring proper aeration of the soil as a result of the tilling thereof, proper maintenance of a moist condition for the soil, and prevention of undesirable bias in the growth of a plant.

What is claimed is:

1. In a device for automatically caring for at least one potted plant, rotary support means for supporting a potted plant, moving means operatively connected with said rotary support means for turning the latter, container means for containing liquid to be supplied to the potted plant, said container means having a flexible wall portion, feed-tube means communicating with said container means and extending therefrom to the potted plant for feeding liquid from said container means to the potted plant when liquid is discharged out of said container means, and at least one cam carried by said support means for movement along a predetermined path during rotary movement of said support means, said container means being situated in said path, and said cam cooperating with said container means for compressing the same for discharging liquid out of said container means through said feed-tube means to a potted plant supported by said support means 2. The combination of claim 1 and wherein said container means is transparent so that the amount of liquid therein can be seen.

3. The combination of claim 1 and wherein said feed-tube means is in the form of a capillary tube while said container means has a cover sealing and closing said container means after the latter has been filled with liquid so that after each liquid-feeding time air can pass through said capillary tube into said container means to be situated above liquid therein whereby during the next compression of said container means by the cam a further amount of liquid will be fed to soil or the like in a pot supported by said support means.

4. The combination of claim 1 and wherein a tilling means is positioned with respect to said support means for extending at least partly into soil or the like in a pot supported on said support means for tilling the soil in the pot during relative movement between the soil or the like and the tilling means.

5. The combination of claim 4 and wherein a base means carries a bearing means which supports said support means for rotary movement with a potted plant carried by said support means.

6. The combination of claim 5 and wherein said tilling means includes an arm carried by said base means and a tined element carried by said arm and having tines for extending into soil or the like in a potted plant.

7. The combination of claim 6 and wherein said arm is adjustably carried by said base means for adapting the tilling means to pots of different sizes.

8. The combination of claim 7 and wherein a fixing means releasably fixes said arm in an adjusted position with respect to said base means.

9. The combination of claim 6 and wherein said arm is in the form of a hollow tube, while said feed-tube means extends through said hollow tube from said container means to a location adjacent said tilling means so as to direct liquid discharged from said container means to soil or the like which has been tilled by said tilling means.

* * * * *